US007967398B2

(12) United States Patent
Uchida

(10) Patent No.: US 7,967,398 B2
(45) Date of Patent: Jun. 28, 2011

(54) CORELESS RUBBER CRAWLER

(75) Inventor: Shinji Uchida, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 426 days.

(21) Appl. No.: 12/094,818

(22) PCT Filed: Nov. 22, 2006

(86) PCT No.: PCT/JP2006/323360
§ 371 (c)(1),
(2), (4) Date: Jul. 30, 2008

(87) PCT Pub. No.: WO2007/061013
PCT Pub. Date: May 31, 2007

(65) Prior Publication Data
US 2009/0256418 A1 Oct. 15, 2009

(30) Foreign Application Priority Data
Nov. 24, 2005 (JP) .................................. 2005-339358

(51) Int. Cl.
*B62D 55/253* (2006.01)
(52) U.S. Cl. .......................... 305/165; 305/169; 305/178
(58) Field of Classification Search .................. 305/160, 305/165, 166, 167, 169, 170, 178, 179, 193, 305/195, 199
See application file for complete search history.

(56) References Cited

U.S. PATENT DOCUMENTS

| 3,472,563 A * | 10/1969 | Irgens | 305/112 |
|---|---|---|---|
| 3,948,110 A * | 4/1976 | Lassanske | 305/178 |
| 4,217,006 A | 8/1980 | Dehnert | |
| 5,484,321 A * | 1/1996 | Ishimoto | 446/433 |
| 5,540,489 A * | 7/1996 | Muramatsu et al. | 305/197 |
| 5,984,438 A * | 11/1999 | Tsunoda et al. | 305/169 |
| 6,193,335 B1* | 2/2001 | Edwards | 305/167 |
| 6,733,093 B2* | 5/2004 | Deland et al. | 305/199 |
| 6,769,746 B2* | 8/2004 | Rodgers et al. | 305/166 |
| 6,793,296 B2* | 9/2004 | Deland et al. | 305/167 |
| 7,090,312 B2* | 8/2006 | Soucy et al. | 305/160 |
| 7,114,788 B2* | 10/2006 | Deland et al. | 305/157 |

(Continued)

FOREIGN PATENT DOCUMENTS
EP 1 486 405 A1 12/2004
(Continued)

OTHER PUBLICATIONS
Supplementary European Search Report dated Nov. 10, 2009.

*Primary Examiner* — Russell D Stormer
(74) *Attorney, Agent, or Firm* — Sughrue Mion, PLLC

(57) ABSTRACT

A coreless rubber crawler has a tension body embedded in an endless rubber elastic body in the longitudinal direction thereof, lugs (7) formed at the outer peripheral surface of the elastic body, central projections (2) formed at the center in a width direction of the inner peripheral surface of the elastic body at regular intervals in a longitudinal direction of the elastic body, and drive projections (5, 6) engaging with sprockets and formed at both outer sides in a width direction of the inner peripheral surface of the elastic body at the same intervals as the central projections. Elongated detachment preventing projections (2A) that engage with rolling wheels (20) are formed such that the pitch between the central projections (2) is larger than the pitch between the drive projections (5, 6).

8 Claims, 4 Drawing Sheets

U.S. PATENT DOCUMENTS

| | | | |
|---|---|---|---|
| 7,740,326 B2 * | 6/2010 | Matsuo et al. | 305/178 |
| 7,784,884 B2 * | 8/2010 | Soucy et al. | 305/175 |
| 2009/0195061 A1 * | 8/2009 | Bellemare | 305/157 |

FOREIGN PATENT DOCUMENTS

| | | | |
|---|---|---|---|
| JP | 51-091441 U | | 7/1976 |
| JP | 55087665 A | * | 7/1980 |
| JP | 63270293 A | * | 11/1988 |
| JP | 06-032262 A | | 2/1994 |
| JP | 06032262 A | * | 2/1994 |
| JP | 06-344961 A | | 12/1994 |
| JP | 2000-326878 A | | 11/2000 |
| JP | 2005-263161 A | | 9/2005 |
| JP | 2005-271658 A | | 10/2005 |

* cited by examiner

CORELESS RUBBER CRAWLER

TECHNICAL FIELD

The present invention relates to a coreless rubber crawler having projections formed at an inner peripheral surface thereof, and more particularly, to a rubber crawler having a structure that may prevent rolling wheels from detaching from a base body side, and that can transmit a driving force.

BACKGROUND ART

In a coreless rubber crawler, central projections are normally formed at the center of an inner peripheral surface of a rubber crawler with a fixed pitch therebetween, such that rolling wheels of a base body roll over the projections and such that they transmit a driving force by engaging with sprockets. However, although a decrease in weight can be realized because a core is not embedded in the rubber crawler, the shape thereof is not uniform because the central projections perform both functions of preventing wheel detachment and providing driving force transmission. Additionally, structurally, a large force is applied to the center of the rubber crawler, and end portions of the rubber crawler in a width direction, that is, ear portions of the rubber crawler, become curved inward during use, and may easily contact with a base body (for instance, a frame).

Accordingly, a technique has been developed in which projections having the separate functions of detachment prevention and driving are formed at separate positions at the inner peripheral surface of the rubber crawler (Patent Document 1), thereby reducing curving of the rubber crawler, and improving, to a certain degree, the prevention of detachment.
Patent Document 1: Japanese Patent Application Laid-Open (JP-A) No. H6-32262

The above technique provides projections which are functionally separated into detachment preventing projections and drive projections which are both formed at the inner peripheral surface of the rubber crawler, thereby reducing the curving of the rubber crawler and reducing the occurrence of detachment. That is, the above known technique provides a coreless rubber crawler in which detachment preventing projections are formed at the center in a width direction of the inner peripheral surface at regular intervals in a longitudinal direction so as to engage with rolling wheels, where surfaces at both width sides are used as rolling surfaces of the rolling wheels, and drive projections are formed at both outer sides in a width direction of the inner peripheral surface so as to engage with sprockets.

DISCLOSURE OF THE INVENTION

Problem that the Invention is to Solve

Although the above-proposed rubber crawler may prevent the occurrence of detachment and improve the driving force transmission, there is a demand for improvements in the rubber crawler in order to further improve a function of preventing detachment. In order to meet such a demand, an object of the invention is to provide new improvements to the above rubber crawler so as to further prevent the occurrence of detachment.

Means for Solving the Problem

The invention provides a coreless rubber crawler including: a tension body which is embedded in an endless rubber elastic body in a longitudinal direction; lugs which are formed at an outer peripheral surface of the elastic body; central projections which are formed at the center in a width direction of an inner peripheral surface of the elastic body at regular intervals, in a longitudinal direction of the elastic body; drive projections which engage with sprockets and which are formed at both outer sides in a width direction of the inner peripheral surface of the elastic body, at the same intervals as that of the central projections; and elongated detachment preventing projections which engage with rolling wheels and are formed such that a pitch between the central projections is larger than that between the drive projections.

Effect of the Invention

According to the invention, a heavy core is omitted from the rubber crawler so as to decrease weight. The elongated detachment preventing projections and the drive projections are respectively formed at different positions at the inner peripheral surface of the rubber crawler so as to separate the functions thereof, thereby reducing curving of the rubber crawler and markedly reducing the occurrence of detachment.

BEST MODE FOR CARRYING OUT THE INVENTION

Figure 1:
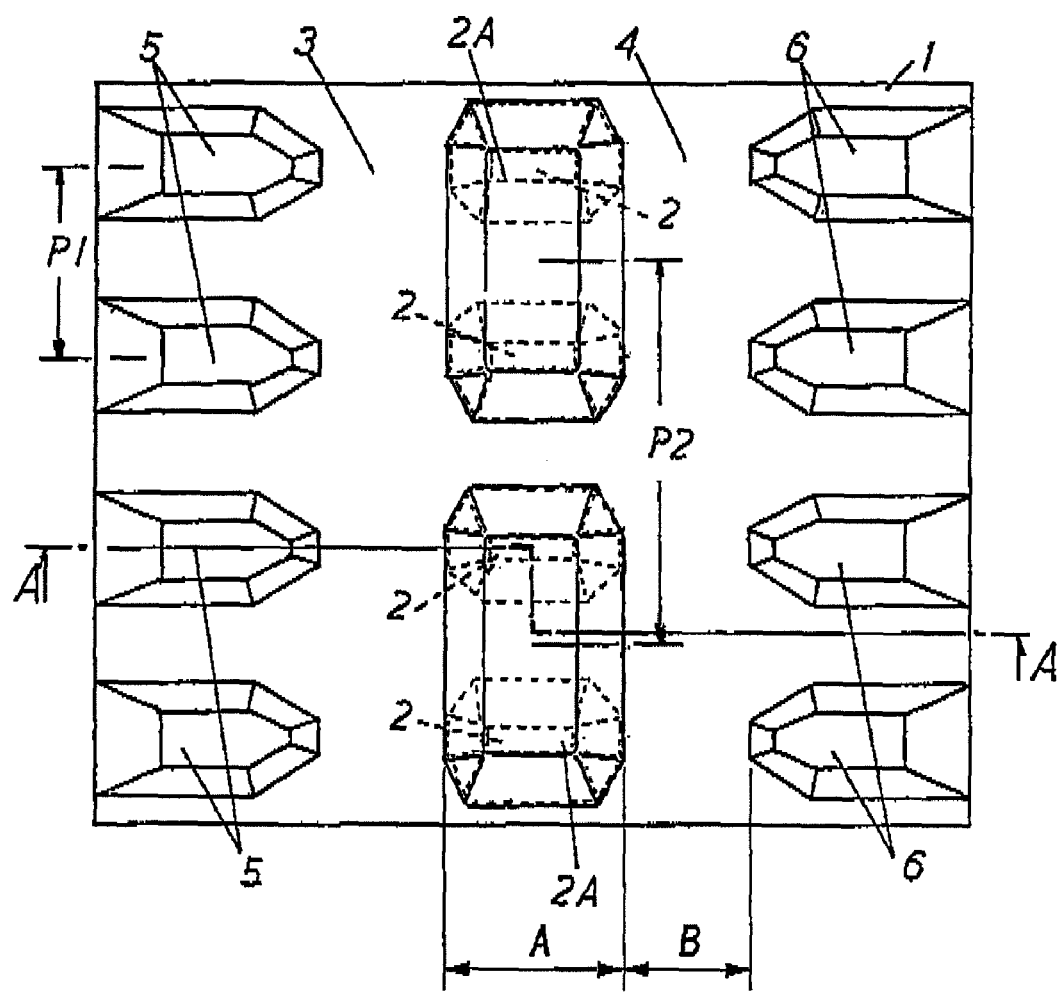
FIG. 1 is a plan view showing an inner peripheral side of a rubber crawler according to a first embodiment of the invention.

A rubber crawler according to the invention includes projections formed at the inner peripheral surface of the rubber crawler that have separate functions; namely, rolling wheels roll over detachment preventing projections, which are formed at the center of the rubber crawler and which are elongated in a longitudinal direction, and engagement with sprockets is achieved by drive projections which are formed at both sides, thereby transmitting a driving force to the rubber crawler.

Accordingly, each projection has been improved only by consideration of the optimal shapes thereof suitable for their respective functions. In the invention, particularly, the detachment preventing projections formed at the center are elongated in a longitudinal direction of the rubber crawler, and accordingly, even when a large external force is applied in a width direction, rolling wheels (or idlers, etc.) do not easily detach from the projections, thereby reducing the occurrence of detachment.

The structure of the invention will be further described with reference to appropriate examples. Elongated detachment preventing projections are formed to engage with the rolling wheels such that a pitch of central projections is larger than that of drive projections. In addition, the central projections and the drive projections may be formed at positions where they overlap one another when viewed from the side. A height of each detachment preventing projection is preferably larger than that of each drive projection. The central projections may also, for example, be connected to each other such that every other central projection is connected. Specifically, an arrangement pitch between the detachment preventing projections may be two times larger than that between the drive projections. Since the detachment preventing projections are elongated in a longitudinal direction, upon being wound around the sprockets or the idlers, the detachment preventing projections may not be in a smooth curve shape, but may be in a polygonal curve shape when viewed from the side, thereby causing a problem of engagement between the drive projections and the sprockets. Thus, in order to prevent such a problem, in a preferred mode of the invention, a recess may be formed in the top portions of the detachment preventing projections, thereby reducing a bending resistance.

A ratio between a width A of the central projections and a width B of a rolling wheel passing surface is set such that $0.8 \leq A/B \leq 1.2$, and a particularly desirable effect can be exhibited thereby. For instance, if the ratio is smaller than 0.8, a guide function is not sufficient, and the possibility of detachment tends to increase. On the other hand, if the ratio is larger than 1.2, ground contact pressure becomes too large and abrasion occurs easily. However, when the ratio is within the above numerical range, these deficiencies can be rectified. An angle of inclination x of each central projection and an angle of inclination y of each drive projection with respect to the longitudinal direction of the crawler are desirably identical. The definition of identical includes a margin of variance of ±5 degrees. When the angle of inclination is within ±5 degrees, since deformations respectively occurring in the central projections and the drive projections when they strike the ground are approximately identical, the rubber crawler does not easily become damaged.

The rubber crawler according to the invention will next be compared with conventional examples. In general, the arrangement pitch of the drive projections needs to be set as small as possible in consideration of the relationship between the driving force and the sprockets. Meanwhile, the detachment preventing projections need to be designed to be as large as possible, from the viewpoint of their original function. However, since these intervals (pitches) are identical, a detachment preventing effect cannot be sufficiently exhibited. With respect to this point, the rubber crawler according to the invention will be described in detail. The central projections are connected to each other such that at least every other central projection is connected, so that a pitch between the central projections is larger than that between the drive projections. When the arrangement pitch of the drive projections on both sides is denoted by P1 and the arrangement pitch of the detachment preventing projections at the center is denoted by P2, the arrangement pitches are designed to be $P2=P1\times 2$. Accordingly, it becomes possible to increase the size of the detachment preventing projections, thereby improving a detachment preventing function.

Embodiment

Figure 2:
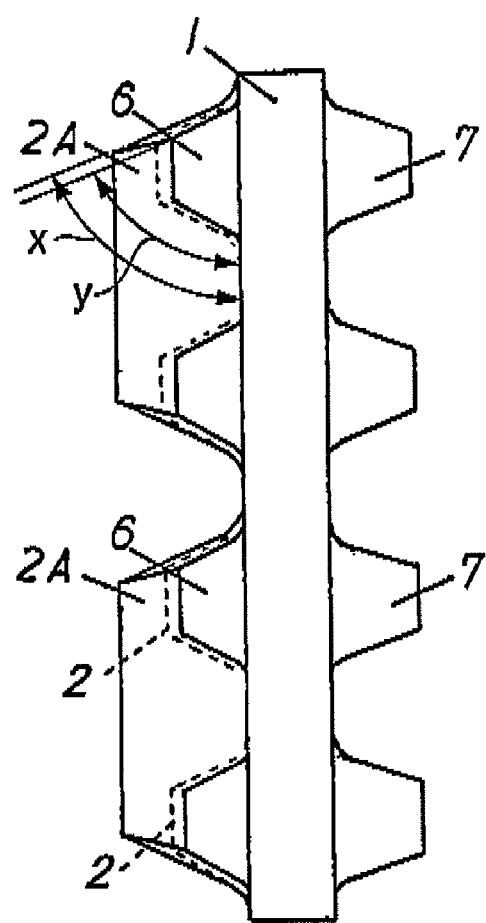
FIG. 2 is a side view showing the rubber crawler shown in FIG. 1.
Figure 3:
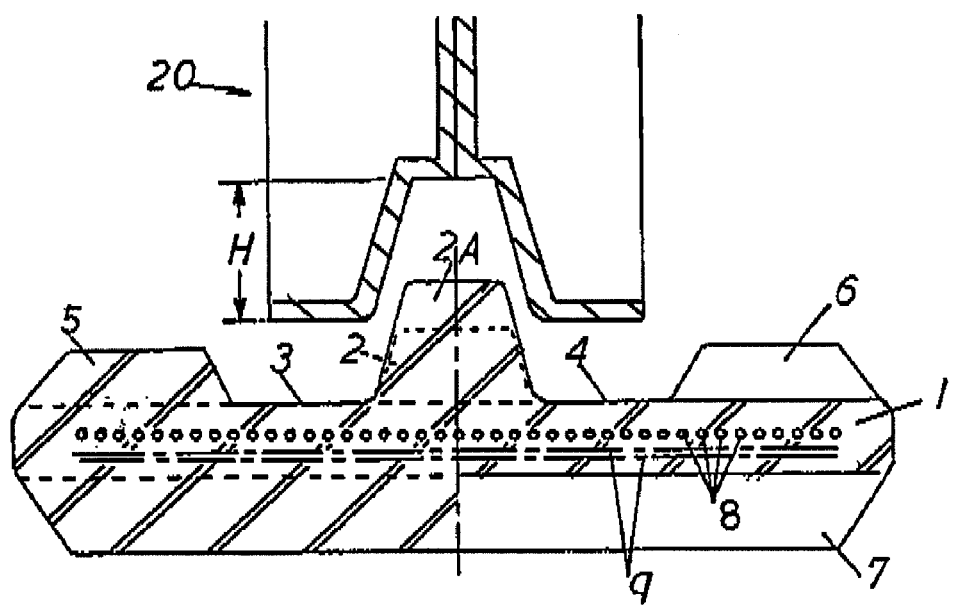
FIG. 3 is a sectional view taken along the line A-A shown in FIG. 1.

Hereinafter, an embodiment of the invention will be described in more detail. FIG. 1 is a plan view showing an inner peripheral side of a rubber crawler according to a first embodiment of the invention. FIG. 2 is a side view. FIG. 3 is a sectional view taken along the line A-A shown in FIG. 1.

Central projections 2 (which are partly depicted by a dashed line) of the conventional art are shown in a dotted manner at the center in a width direction of the inner peripheral surface on a rubber elastic body 1, which is a base body of the rubber crawler, at regular intervals in a longitudinal direction of the elastic body. Both surfaces 3 and 4, at the width sides of the central projections 2, are used as rolling surfaces of the rolling wheels (or the idlers, etc.). In addition, drive projections 5 and 6 engage with sprockets and are formed at both outer sides of the rolling surfaces 3 and 4 at the same pitch as that of the central projections 2. The central projections 2 and the drive projections 5 and 6 are usually arranged in a straight line so as to overlap with each other when viewed from the side. Lugs 7 are usually formed in the outer peripheral surface of the rubber crawler so as to have a bar shape in a width direction and to overlap with the central projections 2 and the drive projections 5 and 6 when viewed from above. Reference numeral 8 denotes steel cords as a tension body, and reference numeral 9 denotes bias cords for reinforcing the steel cords.

Incidentally, although the above mentioned central projections 2 are formed at a conventional position, the most characteristic feature of the invention is that new elongate detachment preventing projections 2A are formed in a longitudinal direction so as to engage with the rolling wheels, such that a pitch between the central projections 2 formed at the center of the above mentioned rubber crawler is larger than a pitch between the drive projections. In other words, the detachment preventing projections 2A are new detachment preventing projections formed at the center of the above mentioned rubber crawler which respectively connect pairs of the central projections 2 at every other central projection (so as to replace pairs of the conventional central projections 2), and which are elongated in a longitudinal direction. Specifically, as shown in the drawing, the arrangement pitch between the detachment preventing projections 2A is two times larger than that between the drive projections 5 and 6.

In this example, a height of the detachment preventing projections 2A is larger than that of the drive projections 5 and 6. Accordingly, a depth H of each rolling wheel 20 rolling over the detachment preventing projections 2A can be configured to be deep, thereby exhibiting the detachment preventing effect. Meanwhile, since the drive projections 5 and 6 are provided only to engage with the sprockets, it is not necessary to increase the height thereof. In the drawing, x denotes an angle of inclination of the central projections and y denotes an angle of inclination of the drive projections. These angles of inclination are approximately identical within a margin of variance of ±5 degrees.

Figure 4:
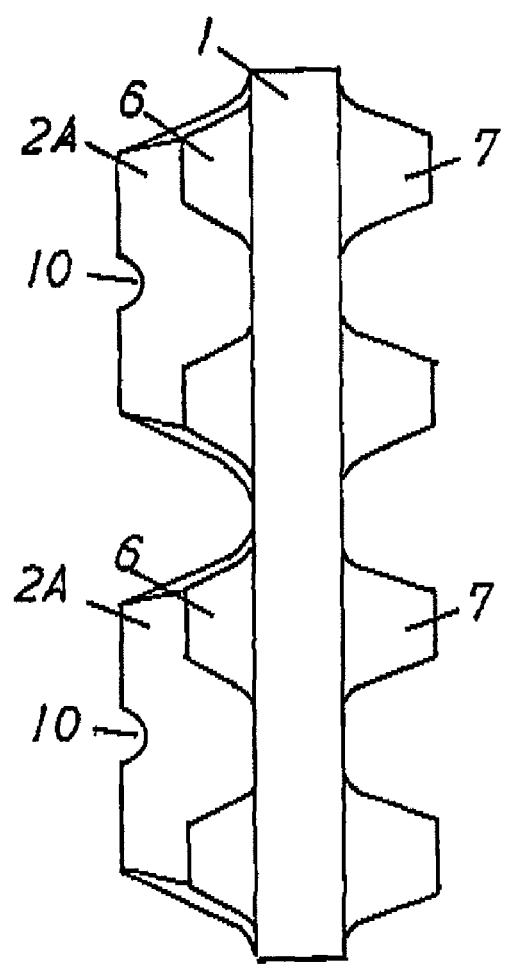
FIG. 4 is a side view showing the rubber crawler according to a second embodiment of the invention.

FIG. 4 is a side view illustrating the rubber crawler according to a second embodiment of the invention. A recess 10 is formed at the top portion of each detachment preventing projection 2A. The recess 10 reduces bending resistance upon winding around the sprockets or the idlers, thereby ensuring a smooth rolling action.

Industrial Applicability

The invention has the above-described configuration. A heavy core is omitted from the rubber crawler so as to realize a decrease in weight. The detachment preventing projections and the drive projections are formed at the inner peripheral surface of the rubber crawler so as to have separate functions. In addition, the detachment preventing projections are formed in the rubber crawler so as to be elongated in a longitudinal direction, thereby further reducing the occurrence of detachment. Accordingly, it is possible to her decrease curving of the rubber crawler, and the above-described configuration may be adopted widely for coreless rubber crawlers.

REFERENCE NUMERALS AND SYMBOLS

1 RUBBER ELASTIC BODY
2 CENTRAL PROJECTION

2A DETACHMENT PREVENTING PROJECTION
3, 4 ROLLING SURFACE
5, 6 DRIVE PROJECTION
7 LUG
8 STEEL CORD
9 BIAS CORD
10 RECESS
20 ROLLING WHEEL
H DEPTH OF ROLLING WHEEL OVER DETACHMENT PREVENTING PROJECTION

The invention claimed is:

1. A coreless rubber crawler comprising:
a tension body embedded in an endless rubber elastic body in a longitudinal direction of the elastic body;
lugs which are formed at an outer peripheral surface of the endless rubber elastic body;
drive projections, including first and second drive projections, which engage with sprockets, the first drive projections formed at one outer side in a width direction of the inner peripheral surface of the endless rubber elastic body and the second drive projections formed at the other outer side of the inner peripheral surface of the endless rubber elastic body, the first and second drive projections being formed at regular intervals in the longitudinal direction of the elastic body; and
elongated detachment preventing projections which engage with rolling wheels and which are formed at the center in the width direction of the inner peripheral surface of the endless rubber elastic body at regular intervals in the longitudinal direction of the elastic body, a pitch between the elongated detachment preventing projections being larger than that between the drive projections.

2. The coreless rubber crawler according to claim 1, wherein the elongated detachment preventing projections and the drive projections are formed at positions at which they overlap with each other when viewed from the side.

3. The coreless rubber crawler according to claim 1, wherein a height of a detachment preventing projection is larger than a height of a drive projection.

4. The coreless rubber crawler according to claim 1, wherein an arrangement pitch between the detachment preventing projections is two times larger than an arrangement pitch of the drive projections.

5. The coreless rubber crawler according to claim 1, wherein a recess is formed at the top centers of the detachment preventing projections when viewed from the side.

6. The coreless rubber crawler according to claim 1, wherein a ratio between a width A of the elongated detachment preventing projections and a width B of a rolling wheel passing surface in a longitudinal direction of the rubber crawler is set such that $0.8 \leq A/B \leq 1.2$.

7. The coreless rubber crawler according to claim 1, wherein an angle of inclination x of the elongated detachment preventing projections is identical with an angle of inclination y of the drive projections in a longitudinal direction of the rubber crawler.

8. The coreless rubber crawler according to claim 7, wherein a margin of variance of the inclined angle is ±5 degrees.

* * * * *